(12) United States Patent
Cavalleri et al.

(10) Patent No.: US 8,127,534 B2
(45) Date of Patent: *Mar. 6, 2012

(54) PELLET LOADED ATTITUDE CONTROL ROCKET MOTOR

(75) Inventors: Robert J. Cavalleri, Coral Springs, FL (US); Thomas A. Olden, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1324 days.

This patent is subject to a terminal disclaimer.

(21) Appl. No.: 12/033,738

(22) Filed: Feb. 19, 2008

(65) Prior Publication Data
US 2009/0235640 A1 Sep. 24, 2009

(51) Int. Cl.
*F02K 9/00* (2006.01)
*F42B 15/10* (2006.01)
(52) U.S. Cl. .............................. 60/255; 60/234; 102/376
(58) Field of Classification Search ............... 60/200.1, 60/255, 234; 102/74, 376, 380
See application file for complete search history.

(56) References Cited

U.S. PATENT DOCUMENTS

| | | | |
|---|---|---|---|
| 2,986,001 A | 5/1961 | Green | |
| 3,581,662 A * | 6/1971 | Grebert | 102/202 |
| 3,584,461 A * | 6/1971 | Debize et al. | 60/251 |
| 3,595,025 A * | 7/1971 | Stockel et al. | 60/267 |
| 3,698,183 A * | 10/1972 | MacDonald et al. | 60/39.47 |
| 4,249,673 A | 2/1981 | Katoh et al. | |
| 4,539,910 A | 9/1985 | Stevens | |
| 5,024,160 A | 6/1991 | Canterberry et al. | |
| 5,440,993 A | 8/1995 | Osofsky | |
| 5,608,183 A | 3/1997 | Barnes et al. | |
| 6,045,638 A * | 4/2000 | Lundstrom | 149/36 |
| 6,352,030 B1 | 3/2002 | Doll et al. | |
| 6,357,357 B1 | 3/2002 | Glasser | |
| 6,692,655 B1 | 2/2004 | Martins et al. | |
| 6,968,676 B1 | 11/2005 | Krishnan | |
| 7,022,196 B2 | 4/2006 | Cesaroni et al. | |
| 7,194,852 B1 | 3/2007 | Krishnan | |
| 7,685,940 B1 * | 3/2010 | Cavalleri et al. | 102/376 |
| 2001/0003294 A1 | 6/2001 | Mahaffy | |
| 2002/0157557 A1 | 10/2002 | Cesaroni et al. | |
| 2007/0044450 A1 * | 3/2007 | Kuninaka | 60/200.1 |

FOREIGN PATENT DOCUMENTS

GB 1 605 168 9/1982

OTHER PUBLICATIONS

European Patent Office, International Search Report and Written Opinion for Application No. PCT/US2009/033248, Mail Date: Dec. 8, 2009.
European Patent Office, International Search Report and Written Opinion for Application No. PCT/US2009/033694, Mail Date: Dec. 7, 2009.

* cited by examiner

*Primary Examiner* — William Rodriguez
*Assistant Examiner* — Gerald Sung
(74) *Attorney, Agent, or Firm* — SoCal IP Law Group LLP; John E. Gunther; Steven C. Sereboff

(57) ABSTRACT

There is disclosed a solid fuel rocket motor which may include a case and a nozzle coupled to the case. A plurality of fuel pellets may be disposed within the case. An igniter may be disposed to ignite at least a portion of the fuel pellets. A pellet retainer may be positioned within the case to retain the plurality of fuel pellets within the case. The pellet retainer may be perforated to allow exhaust gases to flow from the ignited fuel pellets to the nozzle while preventing unburned fuel pellets from being expelled through the nozzle.

12 Claims, 7 Drawing Sheets

PELLET LOADED ATTITUDE CONTROL ROCKET MOTOR

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to solid fuel rocket motors, and to fast response motors suitable for use as attitude control thrusters.

2. Description of the Related Art

Solid fuel rocket motors are commonly used in various configurations to propel rockets and missiles. Small solid fuel rocket motors may also be used to control the attitude and steering of a missile, rocket, or other projectile. Small solid fuel rocket motors used to control attitude are commonly called attitude thrusters or divert thrusters. Solid fuel rocket motors may also be used to turn a vertically-launched missile or rocket into near-horizontal flight. Such rocket motors are commonly called pitch-over thrusters.

The thrust or force produced by a rocket motor is given by the equation for an ideally expanded nozzle.

$$F = m_p * U_e$$

where $m_p$=propellant mass flow rate, and
$U_e$=gas velocity at nozzle exit plane.
The propellant mass flow rate $m_p$ is given by the equation $$m_p = A_p * R_b * P_p$$

where
$A_p$=propellant surface area,
$R_b$=propellant burn rate, and
$P_p$=propellant density.

Thus the propellant surface area $A_p$, the propellant burn rate $R_b$ and the propellant density $P_p$ are important factors that may be used to determine the thrust produced by a solid fuel rocket.

The force produced by a rocket motor results in a linear or angular acceleration of the missile or other body propelled by the rocket motor. The net change in the linear or angular velocity of the missile or other body is proportional to the force produced by the motor integrated over time. The time integral of the force produced by a rocket motor is commonly called the "impulse" of the motor.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
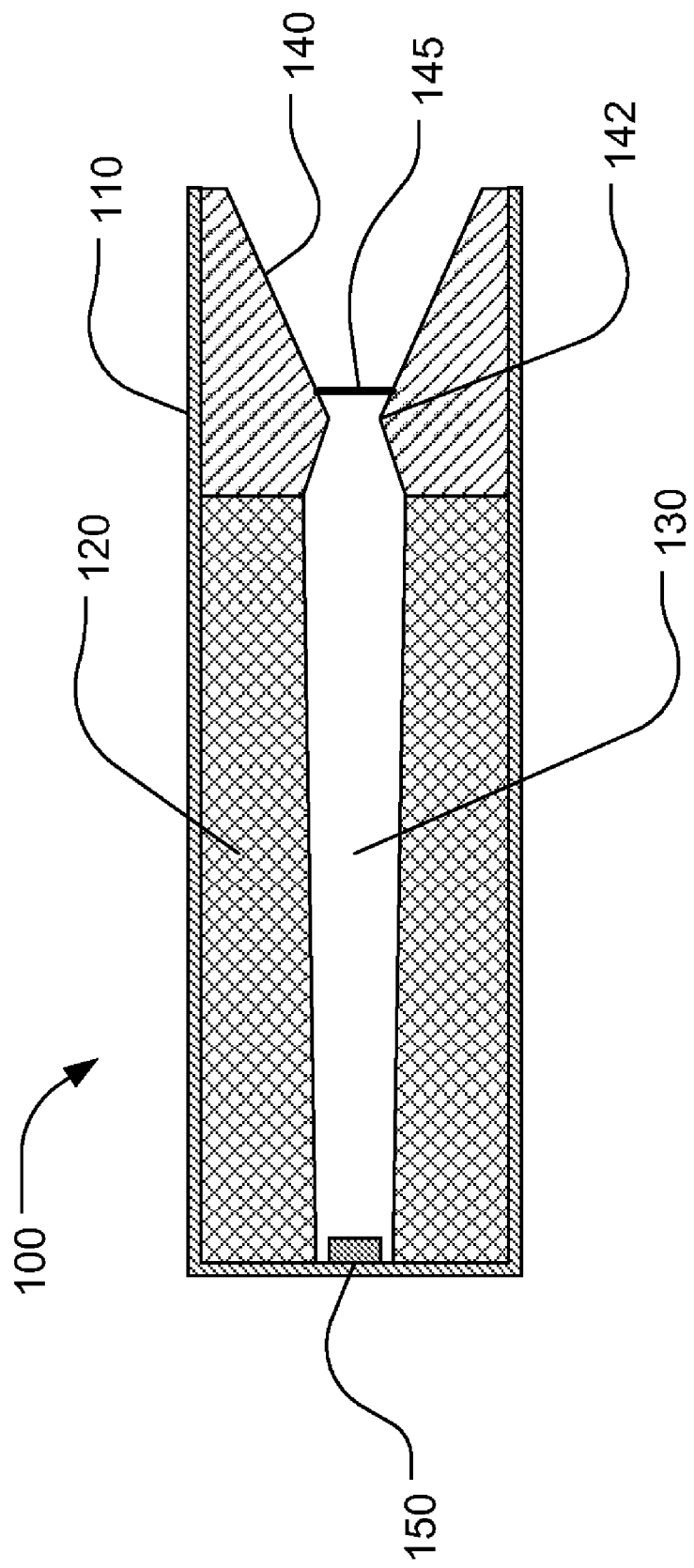
FIG. 1 is a cross-sectional view of a solid fuel rocket motor.

Referring now to the cross-section view of FIG. 1, a solid fuel rocket motor 100 may include a case 110, a solid fuel propellant charge 120 having a longitudinal opening 130, a nozzle 140, and an igniter 150. The solid fuel propellant charge 120 is commonly termed the "grain", and this term will be used within this description. Note that the term "grain" is used to describe the propellant charge 120 as a whole, but does not refer to the weight of the propellant charge, the particle size of the material composing the propellant charge, or the surface texture of the propellant charge.

In order to provide thrust, the surface area of the solid propellant grain 120 must burn to generate gas. To increase the burnable surface area, a longitudinal cavity 130 may be formed in the grain 120. The longitudinal cavity 130 may commonly be centered on the longitudinal axis of the case 110. Once the grain 130 is ignited by the igniter 150, the burning area may rapidly spread to include the entire surface of the longitudinal cavity 130 and, in some cases, the end of the grain proximate to the nozzle 140. A grain with a longitudinal cavity, such as grain 120 with opening 130, may be termed a "center-perforated grain" or an "inside burning grain".

The igniter 150 may be a small charge of flammable material that, when burned, releases a predetermined amount of hot combustion gases. The combustion of the igniter may be initiated, for example, by an electric current flowing through a heater wire adjacent to, or embedded in, the flammable igniter material. In order to ignite the grain 120, the temperature and pressure of the gases produced by the igniter 150 must both exceed predetermined values. To allow pressure to build within the cavity 130, and thus facilitate ignition of the grain 120, the cavity 130 may be sealed by an environmental seal 145. The environmental seal 145 may also serve to protect the grain from environmental effects, such as humidity and precipitation.

The environmental seal 145 may be designed to rupture or blow free from the motor after the pressure within the cavity 130 exceeds a predetermined pressure level, which may be, for example, between 100 and 2000 pounds per square inch (PSI). For example, the environmental seal may be retained in the nozzle by means of shear pins that fracture when the pressure exceeds the predetermined level. The environmental seal may be a burst disc having controlled structural weakness that allows the burst disc to rupture in a controlled manner when the pressure exceeds the predetermined level.

To reduce the time required to ignite the entire surface of the grain 120, the cavity 130 may be pressurized with air or another gas to an initial pressure level during manufacture. For example, the initial pressure in the cavity prior to ignition may be 500 to 2000 PSI. In this case, the environmental seal 145 be designed to retain the initial pressure level indefinitely and to rupture at a substantially higher pressure level after the grain 120 is ignited.

As shown in FIG. 1, the environmental seal 145 may be disposed at or near the portion of the nozzle 140 having the smallest cross-sectional area, commonly termed the throat 142. The environmental seal 145 may be disposed at other locations within the nozzle 140.

Since the ignition of the grain starts at the end proximate to the igniter and then proceeds along the length of the longitudinal cavity, the longitudinal cavity may be tapered slightly, as shown in FIG. 1, to maintain a relatively constant core velocity and minimize erosive burning.

The longitudinal cavity 130 may be shaped as a cylinder or tapered cylinder. To further increase the grain surface area to provide increased thrust, the cross-section of the longitudinal cavity 130 may be a non-circular shape such as a multiply-pointed star, or a circle with radial slots. A grain with a non-cylindrical longitudinal opening may be difficult to fabricate and may incur stresses that lead to cracking or other deterioration of the grain before and during combustion.

Figure 2:
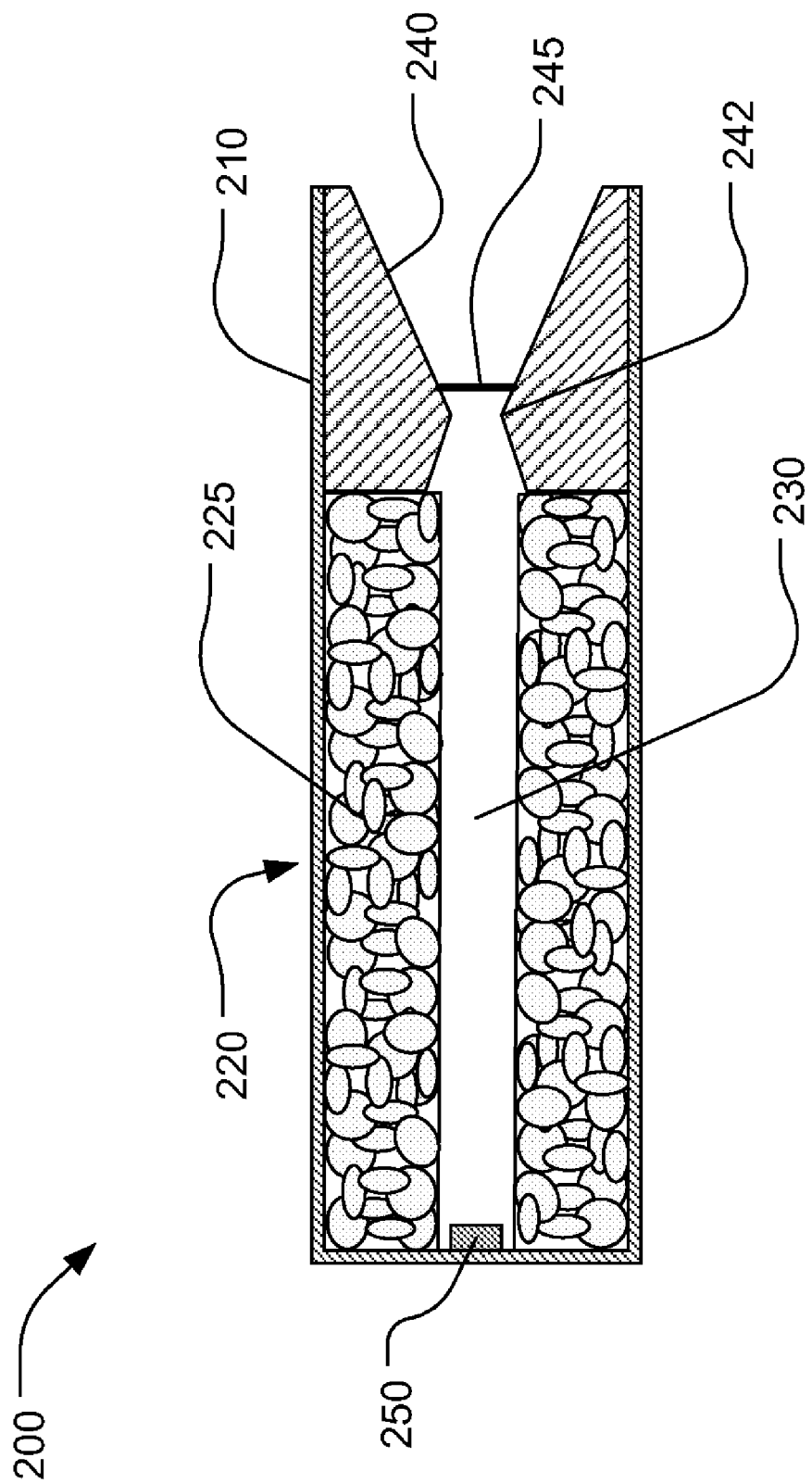
FIG. 2 is a cross-sectional view of a pellet-loaded solid fuel rocket motor.

Referring now to FIG. 2, a pellet-loaded solid fuel rocket motor 200 may include a case 210, a solid fuel propellant charge 220 which may have a longitudinal opening 230, a nozzle 240, and an igniter 250. The solid fuel propellant charge 220 may be composed of a large plurality (hundreds or thousands) of solid fuel pellets 225. The solid fuel pellets 225 may be, for example, gas generator pellets that are produced in large quantities for use in automobile air bags.

Figure 3:
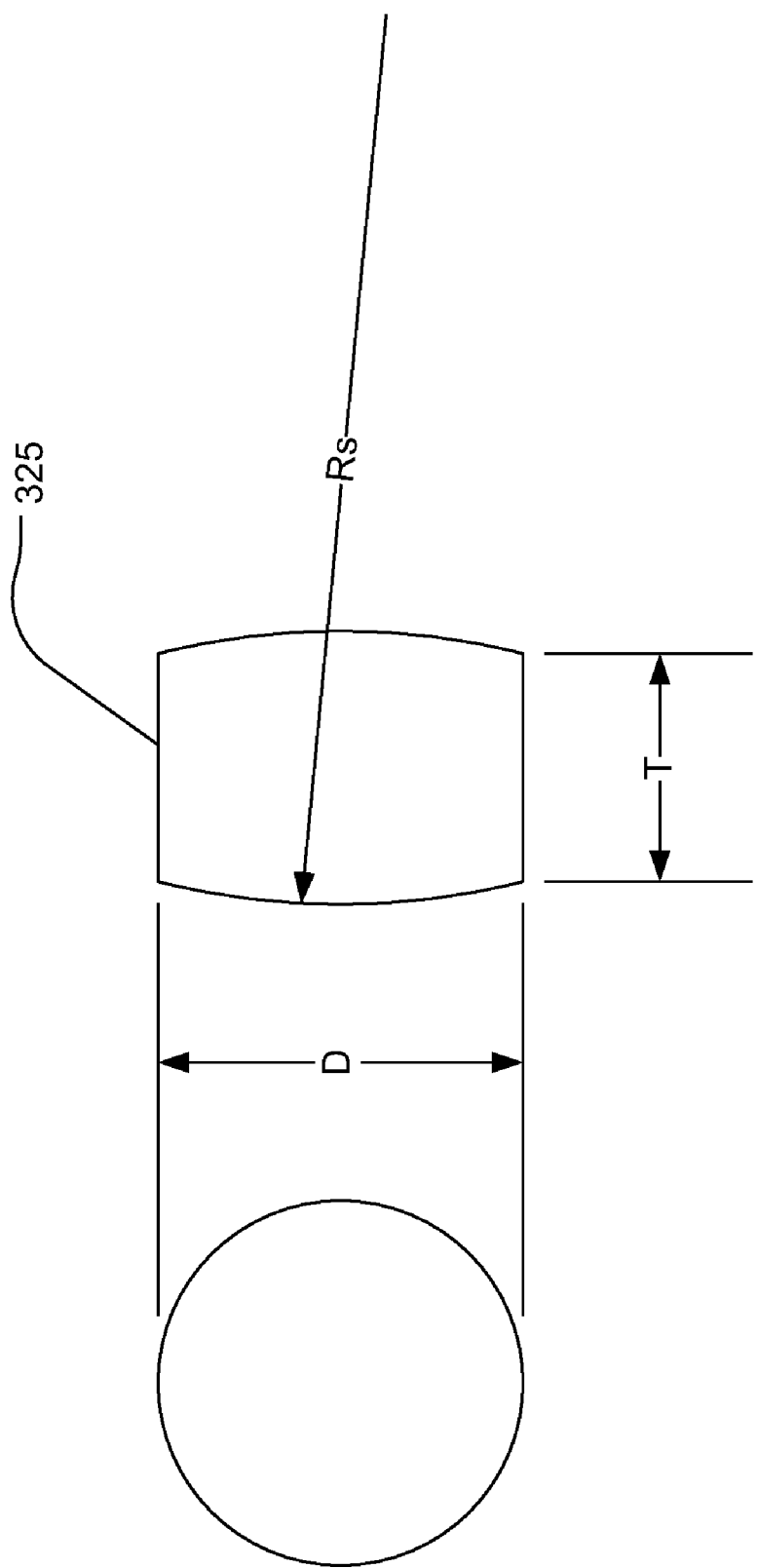
FIG. 3 is an outline drawing of a fuel pellet.

Referring now to FIG. 3, an exemplary solid fuel pellet 325 may be formed in a shape similar to that of a medicine tablet such as an aspirin. Each solid fuel pellet 325 may have a diameter D and a thickness T. Each face of the solid fuel pellet 325 may be convex with a radius Rs. The convex faces may minimize the contact area between adjacent solid fuel pellets and thus prevent the pellets from stacking or agglomerating. The convex faces may thus ensure that a plurality of pellets such as solid fuel pellet 325 will have a very large total burnable surface area. Each fuel pellet may be formed in other shapes including flat discs, spheres, elongated cylinders, elongated cylinders with rounded ends, and other shapes.

Each solid fuel pellet 325 may be composed of at least some of an energetic fuel material and an oxidizer material. Each fuel pellet may contain additional binder and/or plasticizer material. The binder material and the plasticizer material may be reactive and may serve as a fuel material and/or an oxidizer material. Suitable compositions for gas generator solid fuel pellets are well known. Suitable gas generator compositions include, for example, compositions that are predominantly guanidine (or guanidinium) nitrate and basic copper nitrate, cobalt nitrate, and combinations thereof, as described in U.S. Pat. No. 5,6080,183. At least 60% of the total mass of the fuel pellets may be composed of guanidine nitrate and basic copper nitrate. The solid fuel pellets may have relatively low combustion temperatures, for example between 1500° C. and 2000° C., such that components of the rocket motor that are exposed to the combustion products may be fabricated from Molybdenum or TZM (Titanium-Zirconium-Molybdenum) alloy.

Figure 4:
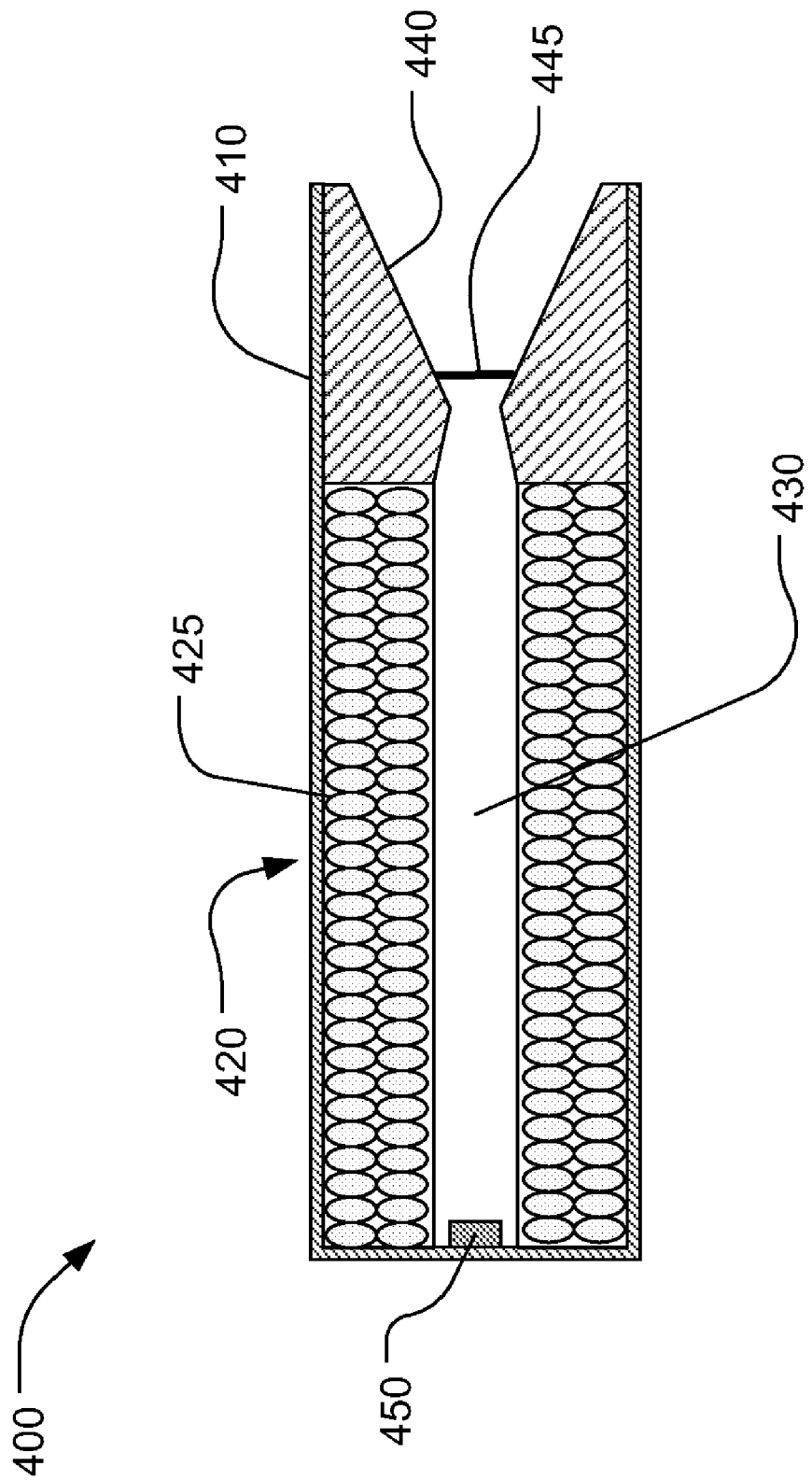
FIG. 4 is a cross-sectional view of a pellet-loaded solid fuel rocket motor.

Solid fuel pellets may be randomly disposed with the rocket motor as previous shown in FIG. 2. Alternatively, as shown in FIG. 4, the solid fuel pellets 425 may be stacked in an ordered manner. The stacking order illustrated in FIG. 4 is exemplary, and many other stacking arrangements may be possible depending on the size of rocket motor and the size of the solid fuel pellets. To facilitate stacking fuel pellets in an orderly manner, the rocket motor may include rods, guides, or other structure (not shown in FIG. 4) to position the and retain the stacked pellets.

The solid fuel pellets 325 may all be identical or may be mixture of two or more pellet compositions or sizes. Some or all of the solid fuel pellets may be coated with an inhibitor to change the burning characteristics of the fuel pellets. The inhibitor may be a non-burning or slowly burning organic, inorganic, or composite material that delays the ignition of the coated pellets and thus prolongs the burning time of the rocket motor. The inhibitor coating may be applied by painting, spraying, dipping or bonding. The thrust versus time profile of the rocket motor may be tailored by combining multiple fuel pellet sizes, compositions, and/or inhibitor coatings.

Figure 5:
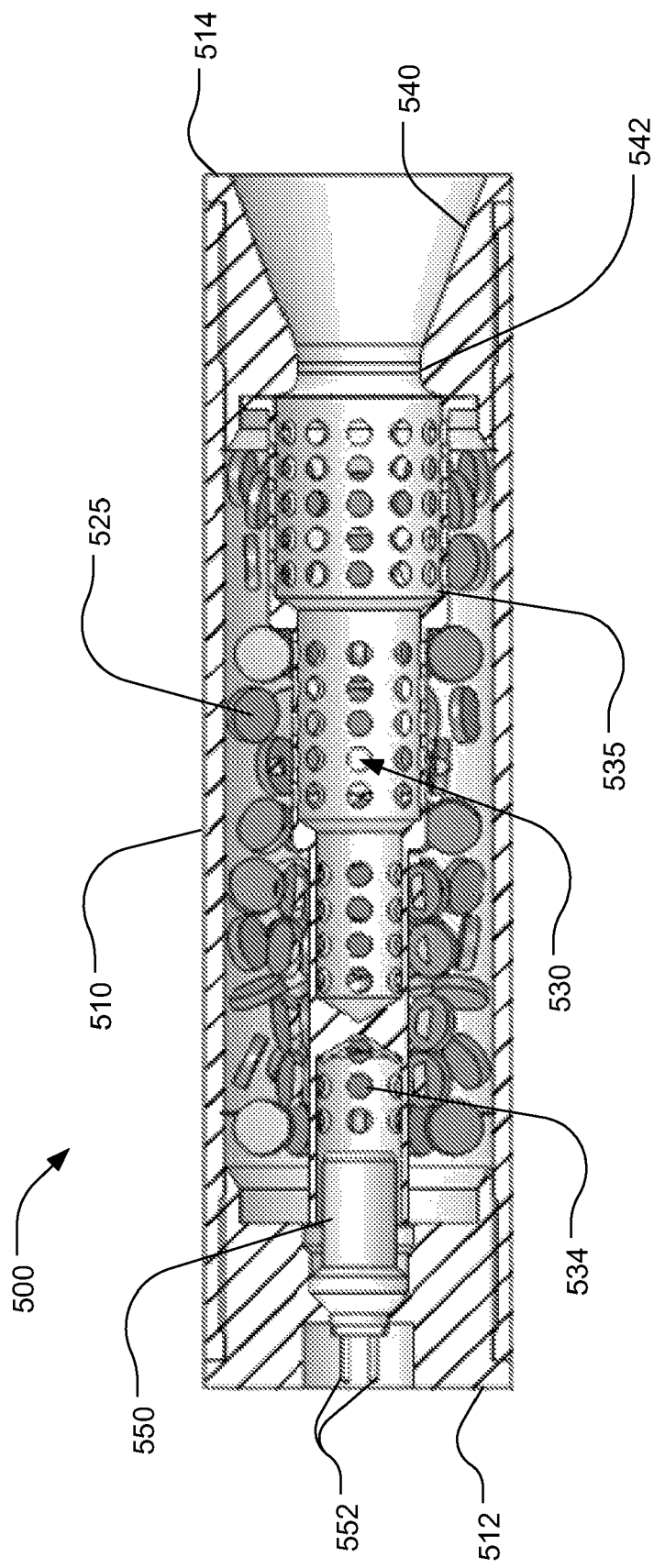
FIG. 5 is a cross-sectional view of a pellet-loaded solid fuel rocket motor.

Referring now to FIG. 5, an exemplary pellet-loaded solid fuel rocket motor 500 may include a case 510 having first and second end caps 512 and 514. In this example, the case 510 may be generally cylindrical in shape. The case 510 may be non-cylindrical and may be conformal to some portion of the vehicle that will be propelled by the rocket motor 500. In this example, first and second end caps 512/514 may be threaded into the case 510, may be welded to the case 510, or may be joined to the case 510 by some other method. The first end cap 512 may include provisions for mounting an igniter 550 such that the electrical connections 552 to the igniter 550 are accessible from outside the rocket motor 500. The second end cap may incorporate a nozzle 540.

The rocket motor 500 may include a large plurality (hundreds or thousands) of fuel pellets 525 that collectively form a burnable grain. The fuel pellets may be retained within the rocket motor by a perforated pellet retainer 535. The term "perforated" intended to encompass any type or shape of openings in the structure of the pellet retainer, and does not imply any particular method of forming or creating the openings. The pellet retainer 535 may, as shown in this example, extend along the length of the rocket motor 500 and may be supported by or coupled to the first end cap 512 and the second end cap 514. The pellet retainer 535 may define a cavity 530 that may be devoid of fuel pellets. The cavity 530 may provide a direct passage for the hot combustion gasses from the burning fuel pellets to the nozzle 540. The cavity 530 may enclose, at least in part, the igniter 550. The cavity 530 may provide a direct passage for the hot combustion gasses from the igniter 550 to the fuel pellets 525.

In the exemplary rocket motor 500, the pellet retainer 535 is shown as a stepped cylinder where the diameter of the cylinder increases in steps from the end adjacent to the igniter 550 to the end adjacent to the nozzle 540. The interior of the stepped cylinder forms the cavity 530. The pellet retainer 535 may be a uniform diameter cylinder, a tapered cylinder or conical shape, or some other shape. The pellet retainer may have an irregular cross-section, particularly, in situations where the rocket motor case 510 is not cylindrical. The pellet retainer 535 may be formed of a thin metal material with machined or chemically formed perforations 534, as illustrated in FIG. 5. The pellet retainer 535 may be formed of a woven or etched screen or mesh. The pellet retainer 535 may be formed as a single physical element, or may include a plurality of physical pieces such as, for example, a plurality of closely spaced metal discs, wires, or rods. However, the pellet retainer is formed, the perforations 534 may be circular as shown, or may be square, rectangular, or elongated slits, or any other shape that allows passage for the combustion gases while retaining the fuel pellets.

The dimensions of the perforations or openings 534 in the pellet retainer 535 may be significantly smaller than at least one dimension of the fuel pellets 525, such that the fuel pellets may not pass through the pellet retainer until combustion is nearly complete. When combustion of the fuel pellets 525 is nearly complete, at least some of the fuel pellets may be swept through the perforations in the pellet retainer 535 into the cavity 530 by the flow of the combustion gases. The size of the perforations 534, relative to the size of the pellets, may be such that at least a portion of the fuel pellets passing through the pellet retainer are completely burned before the fuel pellets pass through the throat 542 of the nozzle 540. Fuel pellets that are completely burned within cavity 530 before passing through the throat 542 may fully contribute to the thrust of the rocket motor. Each fuel pellet that is still burning as it is ejected through the throat 542 may result in an incremental reduction in the total thrust provided by the rocket motor.

The presence of the pellet retainer 535 may, to some extent, restrict the flow of combustion gases from the burning fuel pellets 525 to the nozzle 540. To ensure that the pressure within the rocket motor is governed by the cross-sectional area of the throat 542 within the nozzle 540, the total cross-sectional area of the perforations 534 in the pellet retainer 535 may be larger than the cross-section area of the throat 542.

The case 510, the end caps 512/514, and the pellet retainer 535 may be fabricated of a ceramic material, a metal material such as molybdenum or TZM alloy, or another material capable of withstanding the combustion temperatures of the fuel pellets. The case 510, the end caps 512/514, and the pellet retainer 535 may be fabricated primarily of a material, such as a steel or reinforced composite material, that cannot directly withstand the combustion temperatures of the fuel pellets if suitable thermal insulating layers are provided. The case 510, the end caps 512/514, and the pellet retainer 535 may be fabricated primarily of a material, such as a steel or reinforce composite material, that cannot directly withstand the combustion temperatures of the fuel pellets if the various elements are thick enough to retain physical integrity for the duration of the rocket motor burn in spite of erosion or other degrading effects of the combustion gases.

Figure 6:
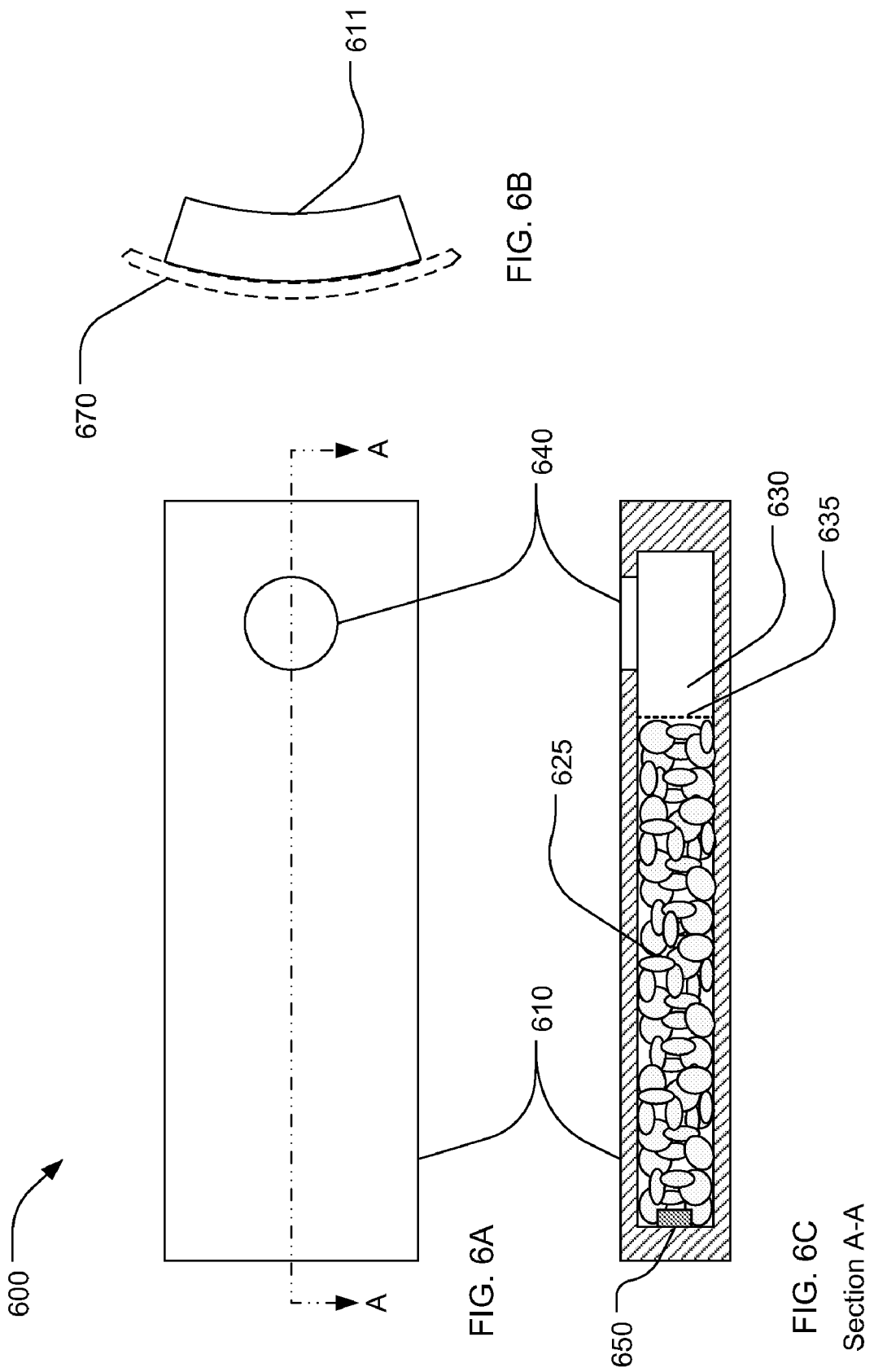
FIG. 6 is a cross-sectional view of an exemplary conformal pellet-loaded solid fuel rocket motor.

Turning now to FIG. 6, a pellet loaded solid fuel rocket motor 600 may not be cylindrical. As shown in the end view of FIG. 6B, the cross section 611 of the rocket motor may be, for example, a wedge-shaped portion of an annular ring intended to conform to the inside curvature of the case 670 of a missile or rocket. The exemplary pellet loaded solid fuel rocket motor 600 may include a case 610. A portion of the case may be filled with solid fuel pellets 625. The solid fuel pellets 625 may be arranged randomly as shown or may be packed in a regular order. In this example, the rocket motor 600 may have a sonic nozzle 640 which is simply an opening through which the combustion gases flow. A pellet retainer 635, such as a screen or perforated plate, may restrain the solid fuel pellets within the case and define a cavity 630 coupled to the nozzle 640. The cavity 630 may have a length along the direction of exhaust gas flow sufficient to allow at least some of the solid fuel pellets to complete burning after passing through the pellet retainer but before being ejected through the nozzle 640.

The pellet loaded solid fuel rocket motor 600 is an example of a rocket motor having a case that is conformal to some other portion of a missile or other vehicle propelled by the solid fuel rocket motor. Since fuel pellets may be randomly packed or regularly loaded into a wide variety of case shapes, rocket motors may be designed to fit into available spaces on a missile or air vehicle where a conventional solid grain could not be used due to fabrication difficulties or stress-related reliability issues.

Description of Processes

Figure 7:
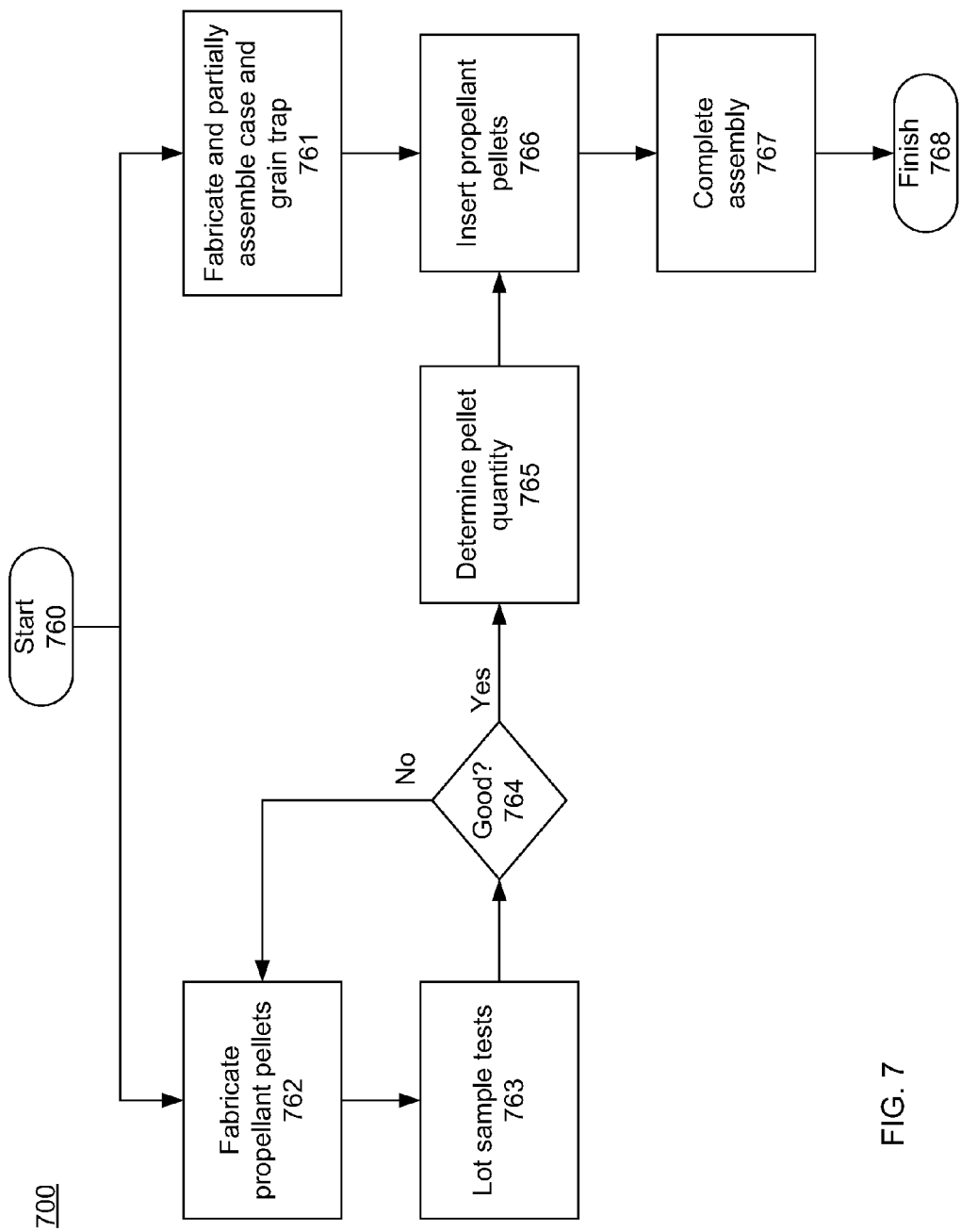
FIG. 7 is a flow chart of a process for making a pellet-loaded solid fuel rocket motor.

Referring now to FIG. 7, a process 700 for fabricating a pellet-loaded solid fuel rocket motor starts at 760 and finished at 768. At 762 fuel pellets may be fabricated in large lots. At 763 the performance of each batch of fuel pellets may be verified by lot sample tests, in which randomly selected samples from throughout the lot are tested. At 764, a determination may be made if the test data from the lot sample tests indicates that the lot of fuel pellets is good and within specification limits.

Assuming the lot of fuel pellets is determined to be good, at 765, the test data from the lot sample tests may be analyzed to determine the exact quantity of fuel pellets that should be loaded into the rocket motor. The quantity of fuel pellets may be determined as a specific number of pellets or as some other convenient metric such as the total weight or mass of the pellets to be loaded into the rocket motor. For example, the number of fuel pellets loaded into a rocket motor may be reduced from a nominal number of 600 pellets to 595 pellets if the lot sample data indicates that a specific manufacturing lot produced pellets that are more energetic than normal. The ability to adjust the number or weight of the pellets loaded into the rocket motor may allow precise control of the total impulse that may be produced by the rocket motor.

The rocket motor components, other than the fuel pellets, may be fabricated and partially assembled at 761. The appropriate quantity of fuel pellets, as determined at 765, may be added to the partially assembled rocket motor at 766, and the assembly of the motor may be completed at 767.

Using the rocket motor 500 of FIG. 5 as an example, the case 510 and the second end cap/nozzle 514/540 may be assembled first. Next, the pellet retainer 535 may be positioned within the case and in contact with the second end cap 514. With the case 510, end cap 514, and pellet retainer 535 partially assembled at 761, the fuel pellets may simply be poured into the rocket motor at 766, taking care to not pour any pellets into the open end of the pellet retainer 535. At 767, the assembly of the rocket motor can be completed by assembling the first end cap 512 and igniter 550.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A solid fuel rocket motor comprising
    a case
    a propellant comprising a plurality of fuel pellets disposed within the case
    an igniter disposed to ignite at least some of the plurality of fuel pellets
    a nozzle coupled to the case
    a pellet retainer disposed within the case
    wherein the pellet retainer is perforated to allow exhaust gases to flow from the ignited fuel pellets to the nozzle while preventing unburned fuel pellets from being expelled through the nozzle, and
    wherein a total of the area of the perforations in the pellet retainer is greater than a cross-sectional area of a throat within the nozzle.

2. The solid fuel rocket motor of claim 1, wherein the plurality of fuel pellets are disposed randomly within a portion of the case.

3. The solid fuel rocket motor claim 1, wherein the pellet retainer defines a cavity devoid of fuel pellets, the cavity adapted to conduct exhaust gases from the plurality of fuel pellets directly to the nozzle.

4. The solid fuel rocket motor of claim 3, wherein the cavity has a length sufficient to allow at least some of the fuel pellets to complete burning after passing through the pellet retainer but before passing through the nozzle.

5. The solid fuel rocket motor of claim 1, wherein the fuel pellets have a combustion temperature below 2000° C.

6. The solid fuel rocket motor of claim 1, wherein the pellet retainer is fabricated, at least in part, from one of molybdenum and TZM alloy.

7. The solid fuel rocket motor of claim 5, wherein at least 60% of the mass of the fuel pellets is guanidine nitrate and basic copper nitrate.

8. The solid fuel rocket motor of claim 1, wherein the plurality of pellets are produced in lots having a lot size substantially larger than the quantity required for a single rocket motor and tested by lot sampling.

9. The solid fuel rocket motor of claim 8, wherein a quantity of pellets comprising the plurality of pellets is determined from a result of the lot sampling.

10. The solid fuel rocket motor of claim 1, wherein the case is non-cylindrical.

11. The solid fuel rocket motor of claim 10, wherein the case has an exterior surface that is, at least in part, conformal to a portion of a vehicle propelled by the solid fuel rocket motor.

12. A solid fuel rocket motor comprising
    a case
    a plurality of propellant pellets
    means to ignite the propellant pellets
    a nozzle to direct gases produced by the ignited propellant pellets to produce thrust
    retaining means to retain the propellant pellets within the case, the retaining means including a perforated pellet retainer, wherein a total of the area of the perforations in the pellet retainer is greater than a cross-sectional area of a throat within the nozzle.

* * * * *